(12) United States Patent
Rapala

(10) Patent No.: US 6,732,584 B2
(45) Date of Patent: May 11, 2004

(54) FUEL LEVEL SENSOR WITH FLEXIBLE CIRCUIT

(75) Inventor: Gregg R. Rapala, Arlington Heights, IL (US)

(73) Assignee: Methode Electronics, Inc., Chicago, IL (US)

( * ) Notice: Subject to any disclaimer, the term of this patent is extended or adjusted under 35 U.S.C. 154(b) by 306 days.

(21) Appl. No.: 09/791,326

(22) Filed: Feb. 26, 2001

(65) Prior Publication Data

US 2001/0007207 A1 Jul. 12, 2001

Related U.S. Application Data

(63) Continuation of application No. 09/224,626, filed on Dec. 31, 1998, now abandoned.

(51) Int. Cl.[7] ............................ G01F 23/36; G01F 23/30
(52) U.S. Cl. ............................................ 73/313; 73/314
(58) Field of Search ................................ 73/290 R, 305, 73/309, 313, 314, 322.5

(56) References Cited

U.S. PATENT DOCUMENTS

| | | | | |
|---|---|---|---|---|
| 3,813,941 A | * | 6/1974 | Miguel et al. | 73/313 |
| 5,051,921 A | * | 9/1991 | Paglione | 73/304 |
| 5,146,785 A | * | 9/1992 | Riley | 73/313 |
| 5,477,727 A | * | 12/1995 | Koga | 73/304 |
| 5,524,487 A | * | 6/1996 | Liu | 73/313 |

* cited by examiner

Primary Examiner—Edward Lefkowitz
Assistant Examiner—Maurice Stevens
(74) Attorney, Agent, or Firm—Blank Rome LLP

(57) ABSTRACT

A fuel level sensor is provided having a flexible printed circuit cylinder, having a buoyant member mounted on a rod and a contact member mounted on the buoyant member which abuttingly contacts the rod and the conductive traces formed on the inside of the flexible cylinder wall.

20 Claims, 1 Drawing Sheet

FUEL LEVEL SENSOR WITH FLEXIBLE CIRCUIT

This is a continuation application of application having Ser. No. 09/224,626, filed on Dec. 31, 1998, which has been abandoned.

The present invention relates to a fuel level sensor. In particular, the invention pertains to a fuel level sensor with a flexible circuit.

BACKGROUND OF THE INVENTION

The present invention pertains to a fuel level sensor and in particular a sensor providing for an assembly having a flexible circuit board forming a flotation cylinder.

Fuel level sensors are known for detecting the fuel level in gasoline tanks of automobiles, several in the art include a buoyant member mounted on a conductive ceramic shaft having a circuit traces axially aligned thereon. The buoyant member includes a contact mounted thereon that contacts the conductive shaft.

As the level of the fuel changes, the buoyant member moves up and down and causes the contact to move along the conductive traces of the shaft, which then sends a signal to the fuel level indicator. However, this assembly requires an expensive conductive shaft that may beome easily cracked and degrade under harsh conditions of a fuel tank etc. A fuel sensor that eliminates this expensive part would be desirable.

It is an object of the present invention to provide for a flexible printed circuit board formed using robust materials in the shape of a cylinder and to provide for a float member that acts as the direct member imparting the contact motion to the circuit member.

SUMMARY OF THE INVENTION

A fuel level canister is provided having a flexible circuit forming a cylinder mounted therein. A flexible circuit includes contact traces formed in parallel along the length of the cylinder. A rod is located at the center of the cylinder and a buoyant member is mounted on the rod. The buoyant member includes a contact finger mounted thereto. The buoyant member is orientated so that upon movement of the buoyant member up and down along the rod, the contact member will abut the conductive traces of the flexible circuit cylinder which will impart a change in the resistance as the buoyant member moves up and down in correspondence to the level of the fluid. The flexible circuit includes connected thereto-resistive elements in correspondence with the conductive traces. In an embodiment resister flip clips are connected to the flexible circuit cylinder.

DETAILED DESCRIPTION OF THE PRESENTLY PREFERRED EMBODIMENT

Figure 1:
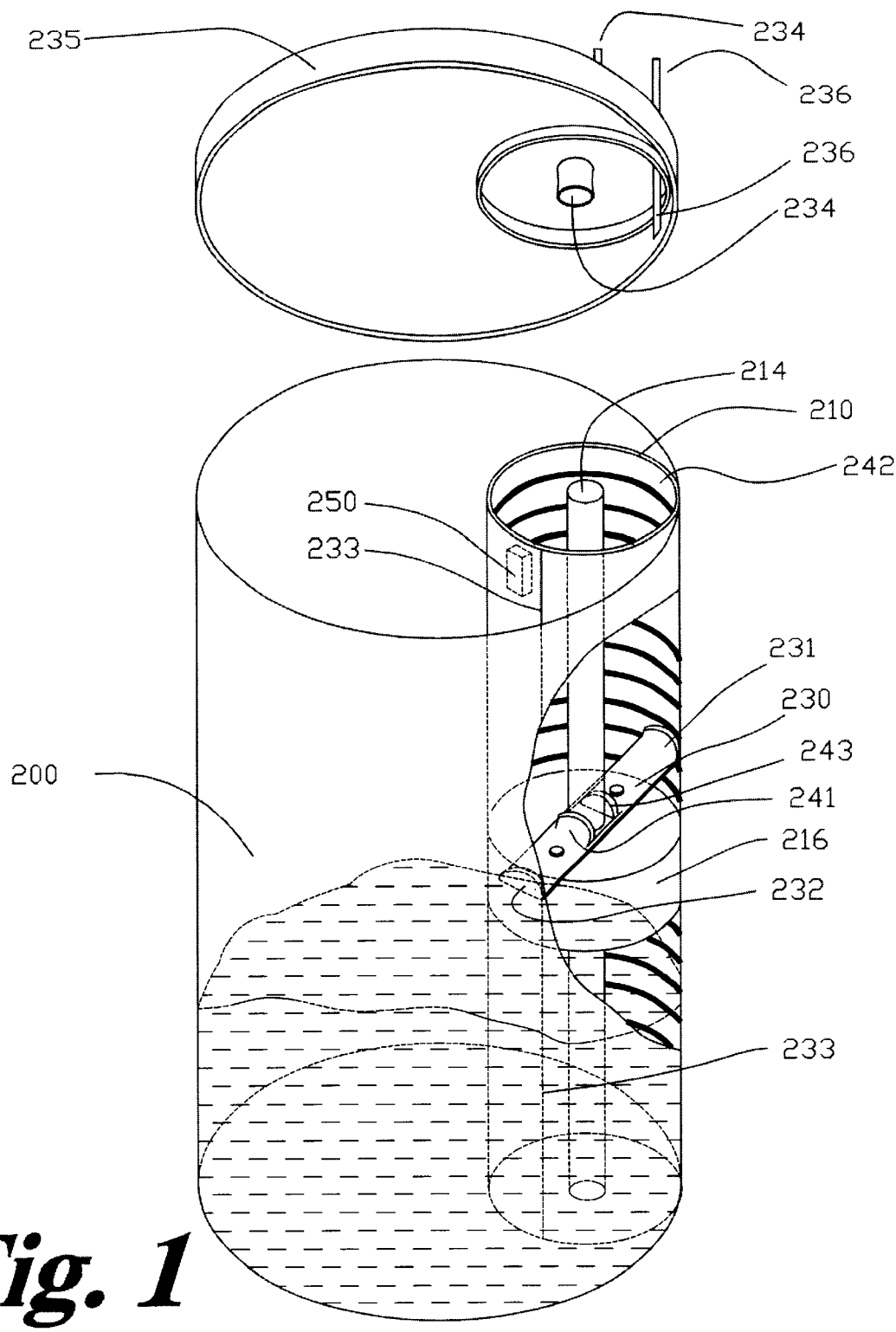
FIG. 1 is a perspective view, partially cut-away of an embodiment of the present invention.

The present invention shown in FIG. 1 is a perspective partially cut-away view. A flexible cylinder 210 is formed from a flexible printed circuit formed on a flexible substrate such as Kapton® having conductive traces 242 formed thereon. The traces 242 could be plated with copper, polymers or silver compositions. In a preferred embodiment the flexible printed circuit member is formed in a flat sheet having the conductive traces 242 formed thereon in parallel lines along the length of the sheet. The flexible printed circuit member may be a polyimide film such as Kapton® by DuPont. The circuit member 210 is rolled into a cylinder or tube and fastened in such an orientation having a seam 233 where opposing ends of the rolled up circuit member 210 meet. The cylinder 210 is then mounted within the fuel canister 200. In a preferred embodiment the fuel canister 200 is mounted in a gasoline tank of an automobile. A rod 214 is mounted within cylinder 210. Mounted on the rod is buoyant member 216 formed in the shape of a cylinder and made of nitrile rubber ebonite such as Nitrophyl® by Rogers Corporation. Mounted on top of the buoyant member is a contact 230 and at each end of the contact 230 is contact finger 231, 232. The contact 230 is fastened to the buoyant member 216. The buoyant member 216 has a hole through its center so that it can slide on the rod 214 without encumbrance. The contact also includes contact fingers 241, 243 that abut against the rod 214. The rod is directly connected to by a contact clip 234 in the cannister cap 235. As the level of the fluid in the canister 200 changes the buoyant member will float up and down within the cylinder 210 causing the contact fingers 232, 231 to abut against the conductive traces 242. As the contact 230 moves along the inside wall of the cylinder 210 the resistance value will change for the current flowing through the contact clip 234 attached to the rod, to the flexible printed circuit member 210 connected to contact clip 236. The contact clips 236, 234 are electrically connected to a fuel gauge that changes its display according to the changes in current through the contact clips 236, 234 as the bouyant member 216 moves up and down. Resistors are connected to the printed circuit member 210. In the preferred embodiment one or more ceramic flip chip resistor elements are mounted to the circuit member 210. Flip chip 250 provides for the electrical resistance and electrical resistance changes when the buoyant member changes its position within the cylinder 210.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A fluid level sensor, comprising:
   a flexible printed circuit member rolled to form a cylinder having a seam where opposing rolled up ends of the flexible printed circuit member meet, and having substantially parallel, electrically isolated, annular conductive traces on the inner surface of the cylinder;
   an electrically conductive rod mounted within and substantially parallel to the cylinder;
   a buoyant member slidably mounted on the rod;
   a contact member mounted on the buoyant member and in abutting contact with the inner surface of the cylinder, wherein upon movement of the buoyant member the contact member contacts a conductive trace having a predetermined resistance.

2. The fuel level sensor of claim 1, the contact member includes a contact finger abutting the electrically conductive rod.

3. The fuel level sensor of claim 1, wherein the flexible printed circuit member includes resistive material electrically connected to the conductive traces.

4. The fuel level sensor of claim 1, wherein the flexible printed circuit member is composed of a polyimide film.

5. The fuel level sensor of claim 4, wherein the flexible printed circuit member is composed of a polyimide.

6. The fuel level sensor of claim 1, wherein the buoyant member is a nitrile rubber ebonite material.

7. The fuel level sensor of claim 6, wherein the buoyant member is composed of a nitrile rubber ebonite formulation.

8. The fuel level sensor of claim 1, wherein the contact member includes a first contact finger at a first end and a second contact finger at a second end, and the first contact finger and the second contact finger abut against the conductive traces.

9. The fuel level sensor of claim 1, wherein the conductive traces are formed with a gap distance between the conductive traces of approximately 0.010 inch.

10. The fuel level sensor of claim 1, wherein the resistive material includes a ceramic flip chip mounted to the cylinder.

11. The fuel level sensor of claim 10, wherein the flip chip includes a network of resistors forming multiple resistance values.

12. The fuel level sensor of claim 11, further comprising a plurality of flip chips.

13. The fuel level sensor of claim 12, wherein a single flip chip is electrically connected to a plurality of conductive traces, and each conductive trace attached thereto has a unique resistance due to electrical connection to the flip chip.

14. A method of making a fuel level sensor, comprising the steps of:

providing a flexible, substantially flat, circuit member;

forming a plurality of parallel, linear conductive traces on a surface of the circuit member;

rolling up the circuit member parallel to the conductive traces to form a cylinder having annular conductive traces on the inner surface;

attaching a network of resistive material to the circuit member and in electrical contact with the conductive traces so as to cause each conductive trace to have a different electrical resistance value;

mounting a conductive rod within and parallel to the cylinder;

mounting a slidable float onto the conductive rod; and attaching a contact member to the slidable float so that the contact member is in electrical contact with the conductive traces as the float slides along the conductive road.

15. A fluid level sensor, comprising:

a rolled up flexible printed circuit member forming a cylinder;

a plurality of substantially parallel, electrically isolated, annular conductive traces on the inner surface of the cylinder, an electrically conductive rod mounted within and substantially parallel to the cylinder and perpendicular to the plurality of conductive traces;

a buoyant member slidably mounted on the conductive rod;

a contact member mounted on the buoyant member that abuts the conductive traces as the buoyant member slides along the conductive rod; and a resistive network mounted to the cylinder and in electrical contact with the plurality of conductive traces so as to cause each conductive trace to have a different electrical resistance value.

16. The fluid level sensor of claim 15, wherein the resistive network comprises thick film resistors.

17. The fluid level sensor of claim 15, wherein each conductive trace is electrically connected to a resistive material giving each conductive trace a unique resistance.

18. The fluid level sensor of claim 15, wherein the resistive network comprises a plurality of flip-chips.

19. The fluid level sensor of claim 15, further comprising:

a contact clip electrically connected to the conductive rod.

20. The fluid level sensor of claims 15, wherein said fluid level sensor is located inside a gas tank of an automotive vehicle.

* * * * *